Jan. 3, 1956

B. S. VILKOMERSON 2,729,744

DEFLECTION WAVEFORM GENERATOR

Filed Nov. 2, 1950

INVENTOR
Benjamin S. Vilkomerson
BY
Kin D. Mitchell
ATTORNEY

United States Patent Office 2,729,744

Patented Jan. 3, 1956

2,729,744

DEFLECTION WAVEFORM GENERATOR

Benjamin S. Vilkomerson, Camden, N. J., assignor to Radio Corporation of America, a corporation of Delaware Application November 2, 1950, Serial No. 193,621

1 Claim. (Cl. 250—36)

Figures 1, 2:
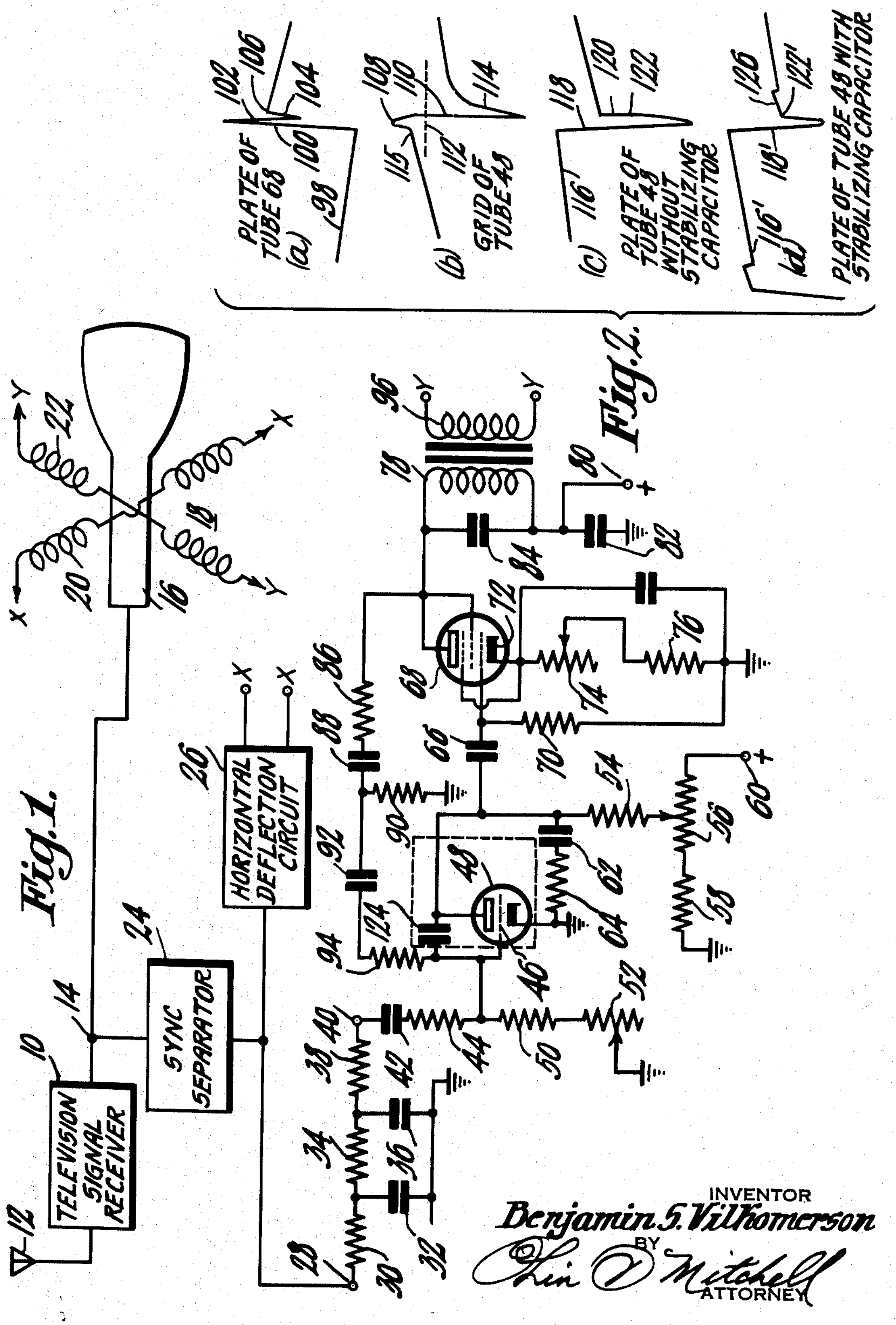

The present invention relates to improvements in the design and construction of oscillators and multivibrators of the type used to generate waveforms of predetermined contour and frequency, and more particularly although not necessarily exclusively, to a novel arrangement for synchronizing and stabilizing the operation of such wave generators.

In more particularity the present invention relates to an improved multivibrator type saw-tooth deflection generator which has improved synchronizing characteristics.

The use of cathode ray beam devices for generating and visually reproducing electrical signal information is steadily increasing in popularity. In a large number of cases it is necessary to provide both vertical and horizontal deflection influences to the electron beam embodied in the cathode ray device. For example, in present day television receivers wide use is made of a cathode ray beam device known as a kinescope for visually reproducing the television scene. The kinescope requires both horizontal and vertical beam deflection.

In most instances it is found that very accurate control of the deflection frequencies and the phase of the deflection action must be maintained in order to produce desirable results. This is especially true in the television art. In present day television receivers the vertical and horizontal deflection waveforms for the reproducing kinescope are usually generated by oscillators or multivibrators which are precisely synchronized by the synchronizing component of the received television signal. In order to obtain maximum precision in the synchronizing process, the deflection waveform generating circuits must be designed to have high noise immunity so that static bursts and other spurious signals received by the television receiver do not adversely effect the timing of the deflection circuits.

Although considerable progress has been made in the television art in the provision of higher noise immunity deflection circuits, most of this work has been in the direction of improving higher frequency deflection circuits such as, for example, the horizontal or line deflection circuit of a television receiver. One of the techniques most contributing to the noise immunity of the horizontal deflection circuit in television receivers is commonly referred to as AFC (Automatic Frequency Control) operation. Such a circuit is clearly set forth in an article entitled "Television Receivers" by Anthony R. Wright, appearing in the RCA Review for March, 1947. However, due to the expense and long time constants involved AFC techniques have not been generally applied to lower frequency deflection circuits such as the vertical deflection system of a television receiver. There therefore remains considerable room for improvements in noise immunity techniques suitable for application to cathode ray beam deflection systems, particularly of the lower frequency variety.

Although the present invention will hereinafter be described in connection with the needs and environment of television receiver deflection systems it will be apparent that the principles of the present invention can be advantageously applied to most any type of deflection system of either high or low frequency which utilizes a multivibrator, blocking oscillator, or relaxation oscillator discharge tube action.

It is therefore a purpose of the present invention to provide an improved signal waveform generating circuit of the type that may be accurately synchronized by a control signal.

It is a further object of the present invention to provide an improved deflection waveform generator circuit for television receivers which has improved noise immunity characteristics over most prior art arrangements.

It is a further object of the present invention to provide a simple, inexpensive yet improved multivibrator type deflection system particularly suited for the generation of vertical deflection waveforms in television receivers and which has a considerably higher noise immunity and phase and frequency stability than heretofore found in most prior art arrangements.

In the realization of the above objects and features of advantage the present invention contemplates the use of an electron discharge tube having its output circuit connected as a conventional saw-tooth capacitor discharge means. The input and output circuits of the discharge tube are further connected in regenerative relationship with each other by any suitable means so as to provide recurrent and periodic states of conduction and non-conduction in the discharge tube. The input circuit of the discharge tube is then adapted to receive synchronizing signals for control of the frequency and phase of the generated saw-tooth produced in the output circuit. Means are then provided for feeding back in phase a part of the output signal to the input circuit at the same time limiting, for a brief period following the conduction period of the discharge tube, the maximum output voltage developed by the discharge tube.

A more complete understanding of the operation of the present invention, as well as a fuller appreciation of its objects and additional features of advantage will be obtained from a reading of the following specification especially when taken in connection with the accompanying drawings, in which:

Figure 1 is a combination block and schematic representation of a television receiver, the vertical deflection circuits of which embody the present invention, and Figure 2 is a graphical representation of certain wave forms which are helpful to the understanding of the present invention.

The complete television receiver of Figure 1 constitutes a television signal receiver 10 having its input connected with an antenna 12. The block 10 may, of course, include a radio frequency tuner, a superheterodyne converter, an intermediate frequency amplifier, a signal detector and a video amplifier as for example, shown in the above identified article by Anthony R. Wright, appearing in the RCA Review. The demodulated television signal appearing at the output terminal 14 of the receiver 10 is, of course, applied to the input of the kinescope 16 for intensity modulation of the electron beam therein. The kinescope 16 will, of course, be provided with suitable brightness circuits and beam accelerating potential connections which have not been shown in the drawing. The beam in the kinescope 16 is adapted for electromagnetic deflection by means of the deflection coil 18 having vertical and horizontal deflection windings at 20 and 22 respectively.

The output of the receiver 10 is further applied to the input of some form of sync separator circuit 24. As shown in the above RCA Review article the sync separator circuit separates the synchronizing component of the received television signal from the video frequency components. The output of the sync separator 24 is then applied to the horizontal deflection circuit 26 for synchronization thereof as described in the above identified article entitled "Television Receivers." The horizontal deflection circuit usually differentiates the separated sync so as to extract only horizontal (high frequency) synchronizing information and applies this horizontal synchronizing information to an automatic frequency control circuit which regulates the frequency and phase of the horizontal deflection circuit. The output of the horizontal deflection circuit 26 is, of course, available at terminals x—x which are intended for connection to the corresponding terminals x—x of the horizontal yoke deflection winding 20.

The output of the sync separator 24 is also applied to the input 28 of an integrating network comprising resistances 30, capacitance 32, resistance 34, capacitance 36 and resistance 38. The action of this integrating network to pass only vertical synchronizing information (low frequency variations) and discriminate against the horizontal synchronizing signals (high frequency variations) is well-known in the art. The vertical sync appearing at the output terminal 40 of the integrating network is then applied through capacitance 42 and resistance 44 to the grid 46 of the discharge tube 48. The D. C. resistance to ground from the grid 46 is made variable thru the provision of fixed resistance 50 connected in series with the rheostat 52. The output circuit of the discharge tube 48 comprises a resistance 54 connected to a sliding tap or potentiometer 56. Potentiometer 56 is connected as a bleeder to ground thru resistance 58 for the positive B potential appearing at terminal 60. The output circuit for tube 48 also includes a saw-tooth discharge circuit comprising capacitor 62 in series with peaking resistor 64. The output circuit of tube 48 is capacitively coupled by a capacitor 66 to the input circuit of tube 68. The input circuit of this tube includes the resistance 70 connected from the grid of the tube to ground. The cathode 72 of tube 68 is connected through a variable degeneration control potentiometer 74 and through fixed resistance 76 to ground. The tube 68 is connected as a triode output amplifier for deflection signals and as such has its anode and screen electrode connected to the upper terminal of the deflection output transformer primary 78. The lower terminal of the transformer primary 78 is connected with a source of positive B potential having a terminal at 80. Capacitor 82 merely acts as a conventional decoupling capacitor. To complete the output circuit for the tube 68 a capacitor 84 is connected in shunt with the primary winding inductance 78. This is well-known in the art and acts to increase the retrace interval of the deflection output stage.

To obtain self-excited oscillation and generation of deflection signals the upper terminal of the deflection transformer primary winding 78 is regeneratively coupled to the input circuit of the tube 48 via the network comprising resistance 86, capacitance 88, resistance 90, capacitance 92 and resistance 94. The vertical deflection signal is applied to the vertical deflection yoke winding 22 by means of its connection to the output terminals y—y of the output transformer secondary 96.

The operation of the deflection circuit thus far described is conventional in form and forms no part of the present invention. In brief the charging of capacitor 62 produces the saw-tooth waveform for the excitation of the output tube 68. After the capacitor 62 has charged in saw-tooth fashion up to a certain potential so as to increase the plate voltage on the tube 48, conduction on the tube 48 commences. This decreases the current flow through the deflection output transformer winding 78 and causes a positive going pulse to appear at the upper terminal thereof. This positive pulse, commonly referred to as a "fly-back" pulse is fed back to the grid 46 of the tube 48 to further drive the tube into conduction. The action of the "fly-back" pulse is to cause grid current to flow in the tube 48 with the consequent charging of the capacitors 42 and 92. Due to the charging of these capacitors as soon as the fly-back pulse terminates the control grid 46 of tube 48 will be left highly negative beyond plate current cut-off. This will allow the saw-tooth capacitor 62 to commerce charging and thus begin the deflection cycle of the cathode ray beam. As is well known this deflection cycle can be synchronized through the application of positive going sync pulses to the grid 46 of the tube 48. The connections already described on the output of the integrating circuit to the grid of the tube 48 serve this purpose. The positive going sync pulse initiates conduction in the tube 48 to define the beginning of the reference interval and hence the beginning of the next deflection cycle.

The operation of the deflection circuit which is described although well-known in the art, may be most clearly analyzed through the use of the waveforms shown in Figures 2*a*, 2*b* and 2*c*. Figure 2*a* depicts the voltage appearing at the upper terminal of the deflection output transformer primary winding 78 which is the plate voltage of the tube 68. The rather linear sloping part 98 of the curve in 2*a* represents the linear charging of saw-tooth capacitor 62, whereas the steep upward going swing 100 corresponds to the positive fly back pulse previously described. The downward and upward going pulses 102, 104 of the curve in 2*a* represent ringing of the output transformer primary 78 taken in connection with its capacitance 84. The point 106 in curve 2*a* represents non-conduction in the tube 48 and the beginning of the linear charge of saw-tooth capacitor 62. The counterpart of the voltage wave form shown in Figure 2*a* is of course apparent on the grid 46 of the saw-tooth discharge tube 48 and is shown in Figure 2*b*. By means of the feed back network connected from the output of tube 68 to the input of tube 48, the fly back pulse shown in Figure 2*a* is substantially broadened to appear as shown at 108 in Figure 2*b*. The downward going portion 110 of the curve in Figure 2*b* represents the previously described negative swing of the tube 46 at the termination of the fly back pulse. The actual plate cut-off grid voltage on the tube 48 may be at some level represented by the dash line 112 so that it is seen that the grid voltage swings considerably past cut-off. The upward sloping section 114 of the curve in 2*b* represents the rather slow discharge of the capacitors 42, 92 etc. that previously obtained charge due to grid current. While the tube 48 is cut-off the grid voltage 46 as shown in Figure 2*b* slowly increases as does also the plate voltage appearing across capacitor 62. Pretty soon the point 116 of the tube 48 conducts and initiates the fly back pulse discussed above. The curve in Figure 2*c* of course depicts the voltage appearing at the right hand terminal of capacitor 62. The section 116 of the curve in Figure 2*c* represents the linear charge time of the capacitor 62. Section 118 of the curve 2*c* represents the rapid discharge of the capacitor 62 due to conduction of the tube 48. The rapid rising portion 120 of the curve 2*c* represents the voltage rise due to the no longer existent voltage drop across the peaking resistor 64 upon non-conduction of the tube 48. Non-conduction in the tube 48 is indicated at point 122 in Figure 2*c*.

From the above it can be seen that should any stray circuit voltages appear on the grid 46 of tube 48 at a time during the downward sloping portion 110 of curve 2*b* and more particularly in the immediate vicinity of the voltage level 112 the capacitor 62 would be either discharged for a slightly longer period or just the reverse, not discharged the normal period depending upon the polarity of the signal. A spurious signal which would cause the grid 46 to go slightly positive as the voltage passed the level 112 in Figure 2*b*, would cause the capacitor 62 to discharge slightly more than it would have if the spurious signal had been absent. This effect will of course cause interlacing difficulties in the reproduced television image. A very common source of spurious signal in the particular circuit shown is the horizontal fly back pulse which may be capacitively or electromagnetically coupled from the horizontal deflection winding to the vertical deflection winding of the deflection yoke and finds its way through the vertical deflection output transformer onto the grid 46 of the discharge tube 48.

According to the present invention the noise immunity of a waveform generating circuit of the general type shown in Fig. 1 is greatly enhanced through the provision of a capacitor 124 connected between the anode and grid of the discharge tube 48. This capacitor has the novel effect shown by Figure 2*d*. Figure 2*d* illustrates the voltage appearing at the right hand terminal of capacitor 62 on the anode voltage of the tube 48 as did Figure 2*c*. Figure 2*d* however shows this voltage as it appears as a result of the present invention. By means of the capacitor 124 the voltage on the plate of tube 48 is kept from swinging immediately positive in response to the absence of voltage across the peaking resistor 44. Upon cutoff of the tube 48 at point 122′ of Figure 2*d*, instead of the voltage immediately swinging upward on the anode of tube 48, the additional voltage available across the capacitor 62 goes into charging the capacitor 124 as shown by the line 126 in Figure 2*d*. This means that the plate voltage on tube 48 will be kept down to a lower value at a time when the grid 46 of tube 48 accomplishes its downward swing 110 shown in Figure 2*b*. In this way the possibility of additional conduction or discharge of the capacitor 62 due to spurious signals on the grid 46 is reduced since it takes a greater amplitude of signal at the point 112 in Figure 2*b* to prolong conduction for any appreciable time at the reduced plate voltage of tube 48 due to the novel action of capacitor 124. Thus the capacitor 124 acts as a means to maintain the conduction level of tube 48 at a lower value in response to voltage variations in the input circuit of this tube and hence provides an automatic and periodic noise immunizing effect on the deflection circuit at a time when such noise immunity is greatly needed.

In practice it is found that the addition of the capacitor 124 to any type of multivibrator circuit similar to that shown in the figure greatly enhances the phase stability of the system and therefore improves the operation of the waveform generating circuit. It is to be understood that although an explanation of the effect or providing the capacitor 124 between the anode and grid of the tube 48 has been given with respect of the particular circuit shown, such description of theory is to in no way to limit the present invention. In practice I have found that a value of stabilizing capacitor 124 of between 100 and 500 micromicrofarads is optimum for most circuits of the type shown in the figure. For the particular deflection shown greater values than this tends to load the primary winding 78 of the deflection output transformer too heavily. However, where such a loading problem does not exist greater values than 500 micromicrofarads could be used with beneficial results.

In this regard it will be observed that the strategic placement of the capacitor 124 between the anode and control electrode of the grid 48 allows reduction in the actual size of capacitor used for a given voltage damping action on the anode of tube 48 described above. Thus a 200 micromicrofarad capacitor connected between the anode and grid of the tube 48 will, due to the negative going potential on the grid 46 at a time when the anode of the tube 48 is swinging positive, have the effect of a capacitor of much larger value. It is for this reason that a sufficient capacitor to accomplish the improved interlacing and noise immunity effects of the present invention can in fact be realized across the anode and grid of the tube 48 without producing excessive loading of either the deflection output transformer primary or an intolerable increase in the time constant of the saw-tooth charging circuit of which capacitor 62 is a major part.

It will therefore be apparent from the description of the particular embodiment of the present invention shown in the drawing that the improved noise immunity provided by the present invention is applicable to other multivibrators, blocking oscillators and relaxation oscillator circuits than those particularly suited for deflection circuit purposes.

Having thus described my invention what I claim is:

In a cathode ray beam sawtooth deflection signal generating circuit the combination of: a circuit potential datum means for the circuit elements as hereinafter defined; a source of periodically recurrent synchronizing signals subject to fortuitous interference by stray random signals; an electron discharge tube having an anode, cathode and control electrode; an anode power supply source for said tube delivering a positive potential referenced to said datum means; a first resistor galvanically connected from said anode to said positive potential source to form an output circuit; a first capacitor; a peaking resistor connected in series with said capacitor to form a sawtooth defining network; means connecting said sawtooth defining network between said anode and said datum means in charging relation to said power source through said first resistor and in discharging relation to said tube when conducting, the value of said first resistor, said peaking resistor and condenser being chosen to provide a substantially linear sawtooth waveform at said anode upon the causing of periodic conduction and non-conduction in said tube at a frequency corresponding to that of said synchronizing pulses; galvanically conductive input impedance means having substantial resistance; means connecting said input impedance means in galvanically conducting relation between said control electrode and said datum means to form an input circuit through which control electrode current may flow; a second capacitor connected between said control electrode and said datum means in charging relation to input circuit potentials resulting from control electrode current flow to form in combination with said impedance a time constant biasing means having a time constant less than the period of said synchronizing signals; regenerative feed back means coupled with said tube regeneratively feeding back output circuit signals to said input circuit with such magnitude as to cause periodic grid current flow in said tube followed by plate current cutoff therein, the voltage on said first capacitor increasing in a charging manner during intervals of said plate current cutoff; and a third capacitor having a value in excess of 100 micromicrofarads connected substantially directly between said anode and said control electrode to reduce the voltage rise at said anode immediately following conduction in said tube to minimize the likelihood of stray random signals immediately following said synchronizing signals producing random conduction in said tube.

References Cited in the file of this patent

UNITED STATES PATENTS

| | | |
|---|---|---|
| 2,241,762 | Blumlein | May 13, 1941 |
| 2,300,524 | Roberts | Nov. 3, 1942 |
| 2,461,871 | Bass | Feb. 15, 1949 |
| 2,482,150 | Bocciarelli | Sept. 20, 1949 |
| 2,494,241 | Haantjes et al. | Jan. 10, 1950 |
| 2,546,918 | Branson | Mar. 27, 1951 |
| 2,549,764 | Bartels | Apr. 24, 1951 |
| 2,564,588 | Wenot | Aug. 14, 1951 |
| 2,594,104 | Washburn | Apr. 22, 1952 |
| 2,627,025 | Trembly | Jan. 27, 1953 |

FOREIGN PATENTS

| | | |
|---|---|---|
| 535,778 | Great Britain | Apr. 22, 1941 |